United States Patent [19]
Ozutsumi et al.

[11] 3,979,320
[45] Sept. 7, 1976

[54] LIQUID CRYSTAL COMPOSITION

[75] Inventors: Minoru Ozutsumi; Yoshitake Ohnishi; Yoshihide Miyazawa; Michihiro Gonda, all of Tokyo, Japan

[73] Assignees: Hodogaya Chemical Co., Ltd.; Nippon Electric Company, Ltd., both of Tokyo, Japan

[22] Filed: Sept. 18, 1974

[21] Appl. No.: 507,130

[30] Foreign Application Priority Data

Sept. 22, 1973 Japan............................ 48-106521
Sept. 22, 1973 Japan............................ 48-106522
Oct. 30, 1973 Japan............................ 48-121928

[52] U.S. Cl.............................. 252/299; 350/150; 350/160 LC
[51] Int. Cl.$^2$...................... C09K 3/34; G02F 1/13
[58] Field of Search...................... 252/408 LC, 299; 350/160 LC, 150

[56] References Cited
UNITED STATES PATENTS

| | | | |
|---|---|---|---|
| 3,499,112 | 3/1970 | Heilmeier et al. | 252/299 |
| 3,499,702 | 3/1970 | Goldmacher et al. | 252/299 |
| 3,666,947 | 5/1972 | Haas et al. | 252/408 LC |
| 3,773,747 | 11/1973 | Steinstrasser | 252/299 |
| 3,781,088 | 12/1973 | Tsukamoto et al. | 252/408 LC |
| 3,803,050 | 4/1974 | Haas et al. | 252/408 LC |
| 3,814,700 | 6/1974 | Aviram et al. | 252/408 LC |
| 3,838,059 | 9/1974 | Wong | 252/299 |
| 3,920,576 | 11/1975 | Jones, Jr. et al. | 252/299 |

OTHER PUBLICATIONS

Baise, A. I., Teucher, I & Labes, M. M. Appl. Phys. Lett., vol. 21, No. 4, pp. 142–143 (Aug., 72).
Foster, R., Organic Charge–Transfer Complexes, Academic Press, London (1969).
Ohnishi, Y., et al., Applied Phys. Lett., vol. 24, No. 5, pp. 213–216 (Mar., 1974).

*Primary Examiner*—Benjamin R. Padgett
*Assistant Examiner*—T. S. Gron

[57] ABSTRACT

A liquid crystal composition having a homogeneous alignment of the liquid crystalline molecules, comprises a liquid crystal material, for example, nematic, smectic and cholesteric liquid crystal substances, an additive effective for forming the homogeneous alignment, said additive consisting of at least one heterocyclic compound having a five or six-membered heterocyclic ring containing therein at least one atomic group selected from the class consisting of the atomic group of the formulae;

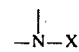

wherein X is a hydrogen atom or substituted or unsubstituted phenyl radical, and at least one atomic group of the formula:

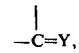

Y,
wherein Y represents an oxygen or sulfur atom, said heterocyclic compounds being different from indigo, and, if necessary, a supplementary additive effective for enhancing the dynamic scattering property of the liquid crystal material, said supplementary additive consisting of at least one substance selected from the class consisting of a. mixtures of a quinone compound and a compound in which oxo groups of the quinone compound are substituted by hydroxyl groups.
b. organic cyclic compounds having either a hydroxyl or amino group, or both, and either a carbonyl or imino group, or both, and
c. mixtures of one or more of the organic cyclic compounds as defined in the above Item (b) and at least one compound selected from the group consisting of the quinone and substituted quinone compounds as defined in the above Item (a).

27 Claims, No Drawings

LIQID CRYSTAL COMPOSITION

The present invention relates to a liquid crystal composition, more particularly, to a liquid crystal composition usable as an electro-optical application in various industrial fields.

Recently, a number of studies of liquid crystals have been carried out in the field of electro-optical control, for example, optical shutters, and electro-optical display of numerals, letters and diagrams. Various phenomena characterizing the liquid crystal substances were discovered as a result of these studies. Such phenomena include the dynamic scattering of light by the liquid crystal; the modification of optical properties by rotating or deforming an optical axis of the liquid crystal; the increase and decrease in the helical pitch of cholesteric liquid crystal; the phase transition of the liquid crystal, and the orientation of the liquid crystalline molecules in a twisted structure.

Further, it has been found that when an electric field, magnetic field or heat is applied, the liquid crystal changes its optical properties in various ways. In the above-mentioned phenomena, the dynamic scattering effect of light has been believed in the past to be an intrinsic property of the liquid crystal and, therefore, even if the liquid crystal is highly purified, the resultant pure substance would still have the dynamic scattering property. This, however, is incorrect. Recently, with the development of purification techniques for liquid crystal, highly purified liquid crystals have been subjected to study with regard to their application for electro-optical display. As a result of the studies, it has been found that highly purified liquid crystals cannot present the dynamic scattering mode under the application of voltage. Further, it has been observed that the dynamic scattering phenomenon can be exhibited only in liquid crystal containing a small amount of conductive impurities. The impurities can be, for example, the unreacted residue of component compounds of the process which produced the liquid crystal, the residue of solvent used for the recrystallization of the crude liquid crystal and water absorbed by the liquid crystal.

Further, it has been proposed to artificially mix the purified liquid crystal substance with an additive capable of imparting the dynamic scattering property thereto. The proposed additives are water, a solvent for recrystallization of the liquid crystal substance, and dodecyl-isoquinolium bromide, tetramethyl ammonium bromide, quinhydrone and 1,5-dihydroxyanthraquinone, which are carriers of electric charge. The dynamic scattering of light can be observed when voltage is applied to a composition consisting of the liquid crystal substance and the additive. The dynamic scattering of the liquid crystal composition depends upon the voltage applied to the composition to a degree which varies according to the type of alignment of the liquid crystalline molecules in the composition, that is, whether the alignment is homogeneous, planer or homeotropic.

The term "homogeneous alignment" used herein refers to an orientation of the liquid crystalline molecules in the nematic state in such a manner that when a liquid crystal substance is placed between a pair of base plates facing each other in parallel and made of a metal, metal oxide or glass, the longitudinal axes of the molecules are in a direction parallel to the facing surfaces of base plates.

The term "planer structure", used herein, refers to an orientation of the liquid crystalline molecules in the cholesteric state in such a manner that when a liquid crystal substance is placed between a pair of base plates facing each other in parallel and made of a metal, metal oxide or glass, the longitudinal axes of the molecules are in a direction approximately parallel to the facing surfaces of the base plates, though there is a slight difference in the angle of direction which results in the helical structure of the molecular alignment, and the axes of the helixes are perpendicular to the base plate surfaces. The planer structure may be expressed by "homogeneous alignment having a helical structure."

The term "homeotropic alignment," used herein, refers to an orientation of the liquid crystalline molecules in such a manner that the longitudinal axes of the molecules are in a direction perpendicular to the base plate surfaces.

The threshold voltage for dynamic scattering, i.e., voltage required to generate the dynamic scattering of light for the liquid crystal composition, is slightly lower in the homeotropic orientation than in the homogeneous alignment. However, both the rise-time and decay-time are shorter in the homogeneous alignment than in the homeotropic alignment. The term "rise-time," used herein, refers to that period of time from the time when a voltage is applied to the time when the dynamic scattering of light is produced in the liquid crystal composition. The words "decay-time," used herein, refers to that period of time from the time when the applied voltage is removed to the time when the dynamic scattering of light disappears.

In order to utilize the electro-optical properties of the liquid crystal substance, it is required that the orientation of the liquid crystalline molecules be definite and the type of the orientation capable of being changed artificially. The most suitable voltage and frequency of the electric field to be applied to the liquid crystal substance are determined in response to the type of alignment. In the case of the "twisted nematic" effect, where the alignment effect of the liquid crystalline molecules in a twisted structure is utilized in the electro-optical field, it is indispensable to a consideration of the operational principle of the effect, that the liquid crystalline molecules be in the homogeneous alignment wherein the longitudinal axes of the molecules are parallel to the base plate surfaces between which the liquid crystal substance is interposed.

Accordingly, in the electro-optical control field utilizing the electro-optical effects of the liquid crystal substances, it is required to define the homogeneous, planer or homeotropic alignment to the liquid crystal substances. The alignment of the liquid crystalline molecules has therefore been studied in some depth.

The results of the study reveal the following:

The homogeneous alignment of the liquid crystalline molecules can be obtained by the following methods.

1. Two plates made of metal, metal oxide or glass are rubbed with a piece of absorbent cotton in a predetermined single direction. The plates are placed a small distance from each other so as to face the rubbed surfaces thereof. A liquid crystal substance or liquid crystal composition is poured between the plates. The liquid crystalline molecules form the homogeneous alignment under the influence of the rubbed plate surfaces. This method is simple and easy but insufficient in uniformity and reproduction of the alignment.

2. In formation of electrodes by depositing a material vaporised under vacuum onto a base plate, the base plate is put at an angle inclined to a vaporization source in accordance with the method of J. L. Janning; Applied physics Letters, Vol. 21, P. 173, 1972. This type of deposit results in a microgrooved thin layer of the deposit material. When a liquid crystal substance or composition is put between a pair of the surfaces prepared above, the liquid crystalline molecules take the homogeneous alignment. This method is the so-called angular deposit method and can impart a very uniform homogeneous alignment to the liquid crystalline molecules. However, there are disadvantages in that the apparatus for the angular deposit method is expensive, the said method requires a long period of time and prodigious labor, and there is difficulty in mass-production of angular deposit electrodes.

In order to obtain the homeotropic alignment of the liquid crystalline molecules, the following methods have been developed.

1. A surface active agent such as lecithin is applied onto a pair of electrodes. The method is insufficient in maintenance of the effect of the surface active agent for a long period of time, that is, durability.

2. A polyamide is added into a nematic liquid crystal substance in accordance with the method of W. Haas et al; Physical Review Letters, Vol. 25, P. 1326, 1970. The resultant composition has the ability to form spontaneously a homeotropic alignment of the liquid crystalline molecules. This method is valuable for providing a liquid crystal composition having a spontaneous homeotropic alignment property.

Further, it is known in F. J. Kahn; Applied Physics Letters, Vol. 22, P. 386, 1973, that it is able to impart either the homeotropic or homogeneous alignment property to the liquid crystal substance by applying onto the base plate surfaces a surface coupling agent consisting of an organic compound having at least one silicon atom. The type of alignment to be imparted to the liquid crystal substance depends on the type of silicon-containing compound. However, this method is unsatisfactory because of the poor durability in efficacy of the silicon-containing organic compounds applied onto the base plate.

In spite of numerous studies such as those stated above, no method of practical usage had yet been developed to artificially impart a property to spontaneously form the homogeneous alignment to the liquid substance inherently having a nematic state wherein the longitudinal axes of the molecules are parallel to each other. At the 4th International Liquid Crystal Conference, 1972, L. Pohl et al stated that an addition of a type of polyamide such as Versamid 125 (trademark of a polyamide made by General Mills) to the nematic liquid crystal substance can impart thereto a property of spontaneously forming the homogeneous alignment. However, such a phenomenon has not been reproduced by the inventor's experiments. Also, no method had yet been developed to artificially impart a property to spontaneously form the planer structure to the liquid crystal substance having a cholesteric state wherein the liquid crystalline molecules are aligned in a helical structure and the axes of the helixes are parallel to each other. Further, the liquid crystal substance or composition capable of exhibiting both the dynamic scattering of light and the homogeneous alignment, was not yet known.

The object of the present invention is to provide a liquid crystal composition capable of spontaneously forming therein a homogeneous alignment of the liquid crystalline molecules.

Another object of the present invention is to provide a liquid crystal composition capable of spontaneously forming therein a homogeneous alignment of the liquid crystalline molecules in a nematic state.

Further, another object of the present invention is to provide a liquid crystal composition capable of spontaneously forming therein a homogeneous alignment having a helical structure of the liquid crystalline molecules in a cholesteric state.

Still another object of the present invention is to provide a liquid crystal composition capable of both spontaneously forming therein a homogeneous alignment of the liquid crystalline molecules and exhibiting the dynamic scattering of light.

The above-mentioned objects are accomplished by a liquid crystal composition of the present invention. According to the present invention, the liquid crystal composition comprises a liquid crystal material and an additive consisting of at least one heterocyclic compound having a five or six-membered heterocyclic ring containing therein at least one atomic group of the formula:

wherein X represents a hydrogen atom or substituted or unsubstituted phenyl radical, and at least one atomic group of the formula:

wherein Y represents an oxygen or sulfur atom.

The additive is preferably mixed in an amount of 0.01 to 3.0%, based on the weight of the liquid crystal material.

The liquid crystal material usable for the composition of the present invention contains at least one substance selected from the group consisting of nematic liquid crystal substances, smectic liquid crystal substances, cholesteric liquid crystal substances and mixtures of two or more of the above-mentioned substances. The nematic liquid crystal substance may be selected from the group consisting of p-alkoxybenzylidene-p'-n-alkylanilines in which the alkoxyl radical in the alkoxybenzylidene group has 1 to 4 carbon atoms and the n-alkyl group in the alkylaniline group has 1 – 12 carbon atoms; p-alkoxybenzylidene-p'-aminobenzonitriles in which the alkoxyl radical in the alkoxybenzylidene group has 1 to 8 carbon atoms; alkyl-p-azoxybenzoate wherein the alkyl radical has 1 to 4 carbon atoms, and; mixtures of two or more of the above compounds.

The p-alkoxybenzylidene-p'-n-alkylaniline may be selected from the group consisting of p-methoxybenzylidene-p'-n-butylaniline, p-ethoxybenzylidene-p'-n-butylaniline, p-propoxybenzylidene-p'-n-octylaniline, p-methoxybenzylidene-p'-n-hexylaniline and p-methoxybenzylidene-p'-n-octylaniline.

The p-alkoxybenzylidene-p'-aminobenzonitrile may be selected from the group consisting of p-butoxybenzylidene-p'-aminobenzonitrile, p-hexyloxybenzylidenep'-aminobenzonitrile and p-n-octyloxybenzylidene-p'-aminobenzonitrile, and the alkyl-p-azoxybenzoate may be ethyl-p-azoxybenzoate.

When a liquid crystal composition of the present invention containing the nematic or smectic liquid crystal substance, is poured between a pair of base plates facing each other across a very small distance to form a thin film of the composition, the composition has a homogeneous alignment of liquid crystalline molecules. This phenomenon is due to the fact that the heterocyclic compound molecules are absorbed on the surface of the base plates in such a manner that the molecular surfaces of the heterocyclic compound molecules which have a long plate-like form, are in parallel to the surfaces of the base plates, and the nematic or smectic liquid crystalline molecules which are linear, are aligned in such a manner that the longitudinal axes of the liquid crystalline molecules are aligned in parallel to the surfaces of the heterocyclic compound molecules.

The cholesteric liquid crystal substances usable for the composition of the present invention may be selected from cholesteryl halides, cholesteryl esters of organic acids and mixtures of two or more of the above compounds. The cholesteryl halide may be either cholesteryl chloride or cholesteryl bromide, and the cholesteryl ester may be selected from the group consisting of cholesteryl nonanoate, cholesteryl benzoate and cholesteryl oleate.

When the liquid crystal composition containing the cholesteric liquid crystal substance is put between a pair of base plates, the resultant thin film of the composition is optically uniform. In the thin film, the heterocyclic compound molecules are absorbed on the surfaces of the base plates in such a manner that the molecular surface of the heterocyclic compound molecules are parallel to the base plate surfaces, and the molecules of the liquid crystal substance are aligned in parallel to the molecular surfaces of the adhered heterocyclic compound molecules. In this alignment of the liquid crystalline molecules of the cholesteric substance, the longitudinal axes of the molecules are approximately parallel to adjacent ones, though there is a slight angle of difference in direction which results in the helical structure of the molecular alignment. The axis of the helix is in the same direction as that of the optical axis of the liquid crystal. In the cholesteric liquid crystal composition of the present invention, the axes of the helixes are perpendicular to the base plate surface.

According to G. Durand et al; Physical Review Letters, Vol. 22, P. 227, 1969, it is known that a mixture of the nematic liquid crystal substance and the cholesteric liquid crystal substance also has a helical structure in the molecular alignment. This phenomenon is analyzed theoretically by T. Nakagiri et al.; in Physical Review Letters, Vol. 27, P. 564, 1971. Although the mixture of the cholesteric and nematic liquid crystal substances has the helical structure and the same optical property as that of the cholesteric liquid crystal substance above, it is not customary to call the mixture a cholesteric liquid crystal. In the present invention, the cholesteric liquid crystal substance may be mixed with a nematic or smectic liquid crystal substance or mixtures of two or more thereof.

The heterocyclic compound usable as the additive for the composition of the present invention must have at least one five- or six-membered heterocyclic ring. Such a type of the heterocyclic compound may be selected from the group consisting of isatin; 2,5-diketopiperazine; 1-phenyl-2,5-diketopiperazine; 1,4-diphenyl-2,5-diketopiperazine; 3-aminopyrazolone; 1-phenyl-3-aminopyrazolone; creatinine; α-amino-γ-butyrolactam; 5-aminobarbituric acid; 5-phenyl-barbituric acid; 5-(o-aminophenyl) barbituric acid; 4-phenylurazol; 4-(p-hydroxyphenyl) urazol; 4-(p-aminophenyl) urazol 1-phenylurazol; 4-methylcarbostyril; carbostyril; 4-hydroxy-carbostyril; hydantoin; hydantoin-imide-(2); hydrouracil; 2,4-tetrahydroquinazoline-dion; 3-methylpyrazolone; 1,2,4-triazole-5-thiol; 1,2,4-triazole-3,5-dithiol; 1-(m-chlorophenyl) barbituric acid; isatoic acid anhydride; 2-hydroxypyridine; 3-amino-1,2,4-triazolo-[1,2-d]barbituric acid; 8-hydroxyquinoline; tautomeric isomers of the above-mentioned compounds, and; mixtures of two or more of the above-mentioned compounds.

Preferably, the additive consisting of the heterocyclic compound is dissolved in an amount of 0.01 to 3%, based on the weight of the liquid crystal material, thereto.

The liquid crystal composition of the present invention may further include a supplementary additive which is effective in prolonging the life of the liquid crystal composition in its electro-optical effect and enhancing the contrast between the optically activated state of the composition and the non-activated state, and a dependency of the optical effect upon the electrical, magnetical or thermal activation. The supplementary additive consists of at least one substance selected from the class consisting of a. mixtures of at least one quinone compound and at least one compound wherein oxo groups in the quinone compounds are substituted for by hydroxyl groups, b. organic cyclic compounds having at least one radical selected from the group consisting of hydroxyl and amino radicals and at least one radical selected from the group consisting of carbonyl and imino radicals, and;

c. mixtures of at least one organic cyclic compound as defined in the above item (b) and at least one compound selected from the group consisting of the quinone compounds and the substituted quinone compounds as defined in the above item (a).

Preferably, the supplementary additive is mixed in an amount of 0.01 to 3% based on the weight of the liquid crystal material, into the material.

In the mixture of the above item (a), the quinone compound may be mixed with the substituted quinone compound in a ratio by mole of 1 : 1 of the oxo groups in the quinone compound to the hydroxyl groups in the substituted quinone compound.

In the mixture of the above item (c), the organic cyclic compound is mixed with the quinone compound, the substituted quinone compound or a mixture thereof in a ratio by mole of 9 : 1 to 1 : 9 of a sum of the radicals in the organic cyclic compound to the oxo groups of the quinone compound, the hydroxyl groups of the substituted quinone compound or a sum thereof.

The effect of the supplementary additive is due to the following mechanism.

1. When the liquid crystal composition of the present invention containing the supplementary additive is placed between a pair of the base plates, the thin film of the composition formed between the base plates has the homogeneous alignment of the liquid crystalline molecules in accordance with the mechanism stated hereinbefore.

2. The addition of the supplementary additive into the composition results in the formation of a reversible oxidation-reduction system in the composition. The reversible oxidation-reduction system thus formed is effective in stabilizing the optical phenomenon exhibited in the composition when a electric, magnetic or thermal activation is applied to the composition.

3. An interaction between the homogeneous alignment and the reversible oxidation-reduction system formed in the composition enhances the life, contrast and dependency of the optical effect produced in the composition. Further, the relative action is effective for shortening the rise-time and decay-time for the dynamic scattering of light.

The quinone compound usable as the supplementary additive may be selected from the group consisting of benzoquinone, naphthoquinone, diphenoquinone, stilbenequinone, anthraquinone, phenanthrenequinone, benzoanthraquinone, benzophenanthrenequinone, functional derivatives of the above-mentioned compounds and mixtures of two or more of the above-mentioned compounds.

The substituted quinone compound usable as the supplementary additive may be selected from the group consisting of hydroquinone, dioxynaphthalene, dioxydiphenyl, dioxystilbene, dioxyanthracene, dioxyphenanthrene, dioxy-benzanthracene, and dioxybenzphenanthrene, functional derivatives of the above-mentioned compounds, and mixtures of two or more of the above-mentioned compounds.

The mixture of said quinone compound and said substituted quinone compound contains at least one complex of said quinone compound and said substituted quinone compound, for example, quinhydrone which is a molecular complex of p-benzoquinone with hydroquinone.

The organic cyclic compound usable as the supplementary additive may be selected from organic cyclic compounds selected from the group consisting of hydroxycyclopentenones, hydroxycyclohexenones, hydroxybicycloheptanones, hydroxyindanones, hydroxynaphthoquinones, hydroxybenzophenones, hydroxydinaphthoquinones, hydroxydiphenoquinones, benzoin, hydroxyacetophenones, hydroxyanthrones, hydroxyanthraquinones, hydroxyphenanthrenequinones, hydroxyfluorenequinones, hydroxynaphthacenquinones, hydroxybenzanthrones, fuchsones, aminocyclohexeneimines, aminobicycloheptanones, aminonaphthoquinones, naphthoquinoneimines, benzoquinoneimines, aminobenzoquinoneimines, aminonaphthoquinone imines, aminobenzophenones, aminoanthrones, aminoanthraquinones, aminohydroxyanthraquinones, aminophenanthrenequinones, aminofluorenones, aminonaphthacenquinones, aminobenzanthrones, aminofuchsones, naphthopyridone, anthrapyridone, aminoanthrapyridones, acridone, phenazine, phenothiazine, phenooxazine and carbazole.

More preferably the organic cyclic compound is selected from the group consisting of hydroxyanthraquinone for example, 1,5-dihydroxyanthraquinone-(9,10) and 5,8,9,10-tetrahydroxyanthraquinone-(1,4); aminoanthraquinone, for example, 1,5-diaminoanthraquinone-(9,10); aminohydroxyanthraquinone, for example, 5,8-diamino-1,4-dihydroxyanthraquinone-(9,10); aminofluorenone, for example, 1-aminofluorenone; aminocyclohexeneimine, for example, 3-amino-1,1-dimethylcyclohexene-(3)-one-imine-(5); aminoanthrapyridone, for example, 6-aminoanthrapyridone; aminobenzoquinoneimine, for example, 6-amino-2-methyl-benzoquinone-(1)-imine-(4), and; aminonaphthoquinoneimine, for example, 2,5-diaminonaphthoquinone-(1)-imine-(4).

The above-stated additive and supplementary additive of the present invention are soluble in the liquid crystal at room temperature. Accordingly, the liquid crystal composition of the present invention is prepared by uniformly dissolving the additive and, if necessary, the supplementary additive into the liquid crystal. The liquid crystal composition containing the supplementary additive has a capability of presenting the dynamic scattering effect for light. That is, when the liquid crystal composition is put between a pair of electrodes and subjected to the application of a DC or AC voltage, the liquid crystal composition displays dynamic scattering of light. Such a dynamic scattering property can be maintained over a period longer than 10,000 hours without decomposition of the composition even under application of a DC voltage. Further, it should be noted that the liquid crystal composition of the present invention can be kept over a very long period without deterioration of the additive and the supplementary additive and change in the molecular alignment and the electro-optical property thereof.

The features and advantages of the liquid crystal composition are further illustrated by the following examples which are not intended to limit the scope of the present invention.

EXAMPLE 1

A liquid crystalline p-methoxybenzylidene-p'-n-butylaniline (MBBA) which was in a nematic state at room temperature, was purified by eliminating volatile substances therefrom under a reduced pressure of 1 mmHg or lower generated by a vacuum pump for 10 hours. The purified MBBA had a specific resistivity of $2 \times 10^{12}$ $\Omega$cm, and did not exhibit dynamic scattering of light even when a DC or AC voltage was applied thereto.

A liquid crystal composition was prepared by uniformly dissolving an additive consisting of 0.5% by weight of 4-phenylurazol into the purified MBBA. The composition was sandwiched between a pair of transparent electrodes made of tin oxide-coated glass (NESA glass). The electrodes were placed, facing each other across a 25 micron distance. Accordingly, the composition was formed into a thin film.

The electrodes were free from pretreatment which results in a changed alignment of the liquid crystalline molecules in the composition, for example, rubbing the electrode surfaces with a cotton piece in a predetermined direction, an electrode formation by angular deposition or pretreatment of the electrode surface with a surface active agent. The composition film thus sandwiched was subjected to polarizing microscopic observation. It was observed that the liquid crystalline molecules in the composition formed a homogeneous alignment. When an AC voltage of 7 volt at a frequency of 50 Hertz was applied between the electrodes, it was observed that the liquid crystalline molecules in the composition film was oriented to form a plurality of uniform stripes. The stripes are the so-called "Williams domains".

Further, when a DC voltage of 45 volts was applied, the composition film exhibited dynamic scattering of light. In the formation of the dynamic scattering, the rise-time was 15 milliseconds. Also, when an AC voltage of 50 volts at a frequency of 50 Hertz was applied, the composition film exhibited the dynamic scattering of light.

From the above example, it was recognized that the addition of 4-phenylurazol into the purified MBBA results not only in the homogeneous alignment of the MBBA molecules but in the exhibition of dynamic scattering of light when a voltage was applied to the composition.

EXAMPLES 2 THROUGH 5

The same procedure as Example 1 was repeated four times using, instead of 4-phenylurazol, isatin (Example 2), 1-phenylurazol (Example 3), 2,5-diketopiperazine (Example 4) and 3-aminopyrazolone (Example 5) in an amount of 0.5% by weight. The MBBA molecules in the compositions of Examples 2 through 5 all took the homogeneous alignment and the compositions all exhibited the dynamic scattering of light when a DC or AC voltage was applied thereto.

EXAMPLE 6

A liquid crystal composition was prepared by dissolving 0.5% by weight of 4-phenylurazol into a mixture of 50 parts by mole of purified p-ethoxybenzylidene-p'-n-butylaniline (EBBA) and 50 parts by mole of purified p-methoxybenzyliden-p'-n-hexylaniline, instead of MBBA. The composition was treated and observed in the same method as in Example 1. It was observed that the liquid crystalline molecules in the composition had a homogeneous alignment and the composition exhibited the dynamic scattering of light when a DC or AC voltage was applied thereto.

EXAMPLE 7

The same procedures and observations as in Example 1 were repeated using a mixture which consists of, in the same amount by mole, of purified p-methoxy-benzylidene-p'-n-octylaniline, purified EBBA and purified p-methoxy-benzylidene-p'-n-hexylaniline, instead of the purified MBBA. It was observed that the liquid crystalline molecules in the composition were in a homogeneous alignment and the composition exhibited dynamic scattering of light when a DC or AC voltage was applied thereto.

EXAMPLES 8 AND 9

The same procedures and observations as in Example 1 were repeated twice using, instead of 4-phenylurazole, 1,2,4-triazole-5-thiol (Example 8) and isatoic acid anhydride (Example 9) in an amount of 0.5% by weight. It was observed that the MBBA molecules in the composition had a homogeneous liquid crystalline alignment and the composition exhibited the dynamic scattering of light when a DC or AC voltage was applied thereto.

EXAMPLES 10 THROUGH 12

The same procedures and observations as in Example 1 were repeated four times using, instead of 4-phenylurazole, isatoic acid anhydride (Example 10), 2-hydroxypyridine (Example 11), and 8-hydroxyquinoline (Example 12) in an amount of 0.5% by weight.

It was observed that the liquid crystalline molecules in the compositions had a homogeneous alignment and the compositions exhibited the dynamic scattering of light when a DC or AC voltage was applied thereto.

EXAMPLE 13

A liquid crystal composition was prepared by dissolving 0.5% by weight of 4-phenylurazol into purified cholesteryl oleate which is in state of cholesteric liquid crystal at room temperature. The composition was placed between a pair of electrodes set 25 microns apart, and subjected to a polarizing microscope observation. It was observed that the liquid crystalline molecules were in a homogeneous alignment having a helical structure and the axis of the helical structure was at an angle perpendicular to the electrodes.

EXAMPLE 14

A liquid crystal mixture was prepared by uniformly dissolving the same amount by mole of purified cholesteryl oleate, purified cholesteryl chloride and, purified cholesteryl nonanoate together. The liquid crystal mixture was in cholesteric state at room temperature. The liquid crystal mixture was mixed with 0.5% by weight of 4-phenylurazol to prepare a composition. The composition was sandwiched between a pair of transparent electrodes placed parallel to each other, and 25 microns apart to form a thin film of the composition. The electrodes were quite free of any form of pretreatment, which would change the alignment of the liquid crystalline molecules, for example, rubbing of the electrode surfaces in a predetermined direction, formation of electrodes by an angular deposition or pretreatment of the electrode surface with a surface active agent. The composition thus sandwiched was subjected to polarizing microscope observation. It was observed that the liquid crystalline molecules were in a homogeneous alignment having a helical structure and an axis of the helix, that is, optical axis is perpendicular to the electrode surfaces. The thin film of the composition exhibited two colors by selective reflection of light in response to the pitch of the helical structure of the liquid crystalline molecules. That is, when no voltage was applied, the composition film exhibited a blue color and when a DC voltage was applied between the pair of electrodes, the color of the composition film shifted from blue to red in response to the voltage applied. When a DC voltage of 500 volts was applied, the composition film exhibited a red color.

For comparison, a liquid crystal mixture similar to that of the present example was prepared except that no 4-phenylurazol was used, and the resultant comparative mixture was observed in the same manner as in the present example. The film of the comparative composition contained therein numerous whitened portions. In the whitened portions, the axes of the helical structures, that is, the optical axis, were not perpendicular to the electrode surfaces.

EXAMPLE 15

A liquid crystalline mixture was prepared by uniformly mixing 95% by weight of MBBA which was in nematic state at room temperature, and 5% by weight of cholesteryl nonanoate which was in cholesteric state at room temperature. A liquid crystal composition was prepared by mixing 0.5% by weight of 4-phenylurazol with the liquid crystalline mixture prepared above. The composition was interposed between a pair of electrodes as in Example 13 to form a transparent thin film of the composition. Under polarizing microscope observation, it was recognized that the liquid crystalline molecules were in a helical structure and the axis of the helix, that is, the optical axis was perpendicular to the base plate. When a DC voltage of 30 volts was applied between the electrodes, the composition film whitened and exhibited dynamic scattering of light. The dynamic scattering was maintained for several tens of hours even after the applied voltage was removed. That is, the composition film indicated a memory effect. Also, when an AC voltage of 40 volts was applied at a frequency of 50 Hertz, the composition film exhibited the same phenomena as those occurring when the DC voltage was applied. While the composition film maintained the dynamic scattering of light after the applied voltage was removed, an AC voltage of 120 volts at a frequency of 5000 Hertz was applied between the pair of electrodes, the composition film recovered its initial transparent state about 30 hours after the applied voltage was removed.

For comparison, the same liquid crystalline mixture as in the present invention was interposed, in the absence of 4-phenylurazol, between transparent electrodes similar to those of the present example. The composition film formed between the electrodes was not transparent.

EXAMPLES 16 THROUGH 19

The same procedures and observations as in Example 15 were repeated four times using, instead of 4-phenylurazol, isatin (Example 16), 1-phenylurazol (Example 17), 2,5-diketopiperazine (Example 18) and 3-aminopyrazolone (Example 19), in an amount of 0.5% by weight. It was observed that the compositions of Examples 16 through 19 had the same helical structure, dynamic scattering of light, memory effect and recovery of the initial transparent state as those in Example 15.

EXAMPLE 20

The same procedures and observations as in Example 15 were repeated using a cholesteric liquid crystalline mixture consisting of 95% by weight of MBBA and 5% by weight of cholesteric chloride. It was recognized that the composition of the present example had the same helical structure, dynamic scattering of light, memory effect and recovery of the initial transparent state as those in Example 15.

EXAMPLE 21

The same procedures and observations as in Example 15 were carried out using 95% by weight of a mixture of the same amount by mole of p-methoxybenzylidene-p'-n-octylaniline, p-ethoxybenzylidene-p'-n-hexylaniline and p-methoxybenzylidene-p'-n-hexylaniline, in place of the MBBA. The resultant cholesteric liquid crystal composition exhibited the same helical structure, dynamic scattering of light, memory effect and recovery of the initial state as those in Example 15.

EXAMPLES 22 THROUGH 25

The same procedures and observations as in Example 15 were repeated five times using, in place of 4-phenylurazol, 1,2,4-triazol-5-thiol (Example 22), isatoic acid anhydride (Example 23), 2-hydroxypyridine (Example 24), and 8-hydroxyquinoline (Example 25), in an amount of 0.5% by weight. The resultant cholesteric liquid crystal compositions all exhibited the same helical structure dynamic scattering of light, memory effect and recovery of initial state as those in Example 15.

EXAMPLE 26

The same procedures and observations as in Example 15 were repeated, using a cholesteric liquid crystalline mixture consisting of 90% by weight of MBBA, 5% by weight of ethyl-p-azoxybenzoate, 5% by weight of cholesteryl nonanoate and 0.5% by weight of 4-phenylurazol. The resulting composition had the same helical structure, dynamic scattering of light, memory effect and recovery of initial state as those in Example 15.

EXAMPLE 27

A liquid crystalline MBBA which was in a nematic state at room temperature, was purified by eliminating volatile substances therefrom under a reduced pressure of 1 mmHg or lower for 10 hours, using a vacuum pump. The purified MBBA had a specific resistivity of $2 \times 10^{12}$ Ω cm.

A liquid crystal composition was prepared by dissolving into the purified MBBA, 0.37% of p-benzoquinone, 0.37% of hydroquinone and 0.5% of isatin based on the weight of the purified MBBA. The composition was put between the same pair of electrodes as used in Example 1 and subjected to a polarizing microscopic observation. It was recognized that the liquid crystalline molecules in the composition form a homogeneous alignment. When an AC voltage of 7 voltas at a frequency of 50 Hertz was applied between the electrodes, the liquid crystalline molecules were aligned in the form of a plurality of uniform stripes (Williams domains).

When a DC voltage of 45 volts was applied, separately, the composition between the electrodes exhibited dynamic scattering of light at a rise-time of less than 15 milliseconds. For comparison, a composition was prepared by mixing the purified MBBA, 0.37% of p-benzoquinone and 0.37% of hydroquinone based on the weight of the purified MBBA. The comparative composition shows no homogeneous alignment of the liquid crystalline molecules.

As stated in Example 1, the composition consisting of the purified MBBA and 5% of isatin based on the weight of the purified MBBA could exhibit dynamic scattering of light when a DC voltage of 45 volts was applied thereto. However, rise-time was 15 milliseconds which is larger than that in the present example.

EXAMPLES 28 THROUGH 33

The same procedures and observations as in Example 27 were repeated 8 times using, instead of isatin, 0.5% based on the weight of the purified MBBA, of 4-phenylurazol (Example 28), 1-phenylurazol (Example 29), isatoic acid anhydride (Example 30), 3-aminopyrazolone (Example 31), 2-hydroxypyridine (Example 32), and 8-hydroxyquinoline (Example 33).

In Examples 28 through 33, it was observed that, as well as dynamic scattering of light, all the compositions exhibited the same homogeneous alignment and Williams domains of liquid crystalline molecules as those in Example 27 and had a rise-time of less than 15 milliseconds.

EXAMPLES 34, 35 AND 36

The same procedures and observations as in Example 27 were repeated three times using, instead of p-benzoquinone, naphthoquinone (Example 34), anthraquinone (Example 35) and phenanthrenequinone (Example 36) in an amount of 0.5% based on the weight of the purified MBBA.

It was observed that as well as dynamic scattering of light, all the compositions of Examples 34, 35 and 36 exhibited the same homogeneous alignment and Williams domains of liquid crystalline molecules as those in Example 27 and had a rise-time of less than 15 milliseconds.

EXAMPLES 37, 38 and 39

The same procedures and observations as in Example 27 were repeated three times using, instead of hydroquinone, dioxynaphthalene (Examples 37), dioxyanthracene (Example 38) and dioxyphenanthrene (Example 39) in an amount of 0.5% based on the weight of the purified MBBA.

It was observed that as well as dynamic scattering of light all the compositions of the examples exhibited the same homogeneous alignment and Williams domains of liquid crystalline molecules as those in Example 27, and had a rise-time of less than 15 milliseconds.

EXAMPLES 40 THROUGH 44

The same procedures and observations as in Example 27 were repeated five times using, instead of the isatin, 5,8,9,10-tetrahydroxyanthraquinone-(1,4) (Example 40), benzoin (Example 41), 5,8-diamino-1,4-dihydroxyanthraquinone-(9,10) (Example 42), 1-aminolfuoreneone (Example 43) and 6-aminoanthrapyridone (Example 44), in an amount of 0.5% based on the weight of the purified MBBA.

It was recognized that in all the compositions of the examples as well as dynamic scattering of light the same homogeneous alignment and Williams domains of liquid crystalline molecules were exhibited as in Example 27, and had the rise-time of less than 15 milliseconds.

EXAMPLES 45 AND 46

The same procedures and observations as in Example 27 were repeated twice using, instead of the purified MBBA, a mixture of the same amount by mole of purified p-ethoxy-benzylidene-p'-n-butylaniline (EBBA) and purified MBBA (Example 45) and a mixture of the same amount by mole of purified EBBA, purified p-methoxybenzylidene-p'-n-octylaniline and purified p-methoxybenzylidene-p'-n-hexylaniline (Example 46).

It was observed that both the compositions of the examples exhibited not only dynamic scattering of light but the same homogeneous alignment and Williams domains of liquid crystalline molecules as in Example 27, and had a rise-time of less than 15 milliseconds.

EXAMPLES 47 AND 48

The same procedures and observations as in Example 27 were repeated twice using, in place of the additive of Example 27, an additive consisting of 0.5% of 4-phenylurazol, 0.3% of naphthoquinone-(1,4) and 0.3% of 1,4-dioxynaphthalene (Example 47) and an additive consisting of 0.5% of 1,2,4-triazole-5-thiol, 0.3% of anthraquinone-(9,10) and 0.3% of 9,10-dioxynaphthalene (Example 48), based on the weight of the purified MBBA. It was recognized that both the compositions of the examples exhibited dynamic scattering of light as well as the same homogeneous alignment and Williams domains of liquid crystalline molecules as in Example 30 and had a rise-time of less than 15 milliseconds.

EXAMPLES 49 THROUGH 52

The same operations as in Example 27 were repeated five times using, instead of isatin, 2,5-diketopiperazine (Example 49), 4-methylcarbostyril (Example 50), hydantoin (Example 51) and 3-methylpyrazolone (Example 52) in an amount of 0.5% and, instead of the sum of p-benzoquinone and hydroquinone, 0.5% of quinhydrone for above examples, based on the weight of the purified MBBA.

The same observations as in Example 27 were repeated for the compositions of the examples except that the DC voltage was applied at 60 volts. It was observed that the both the compositions exhibited dynamic scattering of light and the same homogeneous alignment and Williams domains of liquid crystalline molecules as in Example 27, and had a rise-time of less than 15 milliseconds.

For the sake of comparison, compositions containing no quinhydrone and corresponding to the above compositions of Examples 49 through 52 exhibited no dynamic scattering of light even when a DC voltage of 60 volts was applied.

EXAMPLES 53, 54, 55

The same operations as in Example 27 were repeated three times using 0.5% of creatinine (Example 53), 5-amino-barbituric acid (Example 54) and 3-amino-1,2,4-triazolo-[1,2-d]-barbituric acid (Example 55), instead of the isatin.

The same observations in Example 27 were repeated applying a DC voltage of 60 volts, instead of an AC voltage. It was observed that all of the compositions exhibited the same homogeneous alignment and Williams domains of the liquid crystalline molecules and dynamic scattering of light as those in Example 27, and has a rise-time of less than 15 milliseconds.

For the purposes of comparison, compositions corresponding to the compositions of Examples 53, 54 and 55 were prepared without using p-benzoquinone and hydroquinone. When a DC voltage of 60 volts was applied, the comparative compositions exhibited very weak dynamic scattering of light.

EXAMPLE 56

The same procedures and observations as in Ex 27 were repeated using an additive consisting of 0.3% of isatin, 0.3% of p-benzoquinone, 0.3% of hydroquinone and 0.3% of 5,8-diamino-1,4-dihydroxyanthraquinone-(9,10) based on the weight of the purified MBBA.

It was observed that the composition exhibited the same homogeneous alignment and Williams domains of the liquid crystalline molecules and dynamic scattering of light as those in Example 27, and had a rise-time of less than 15 milliseconds.

EXAMPLE 57

A liquid crystal composition was prepared by mixing a liquid crystalline mixture consisting of 95% by weight of purified MBBA and 5% by weight of cholesteryl nonanoate which is a cholesteric liquid crystalline substance, with 0.5% of 4-phenylurazole, 0.37% of p-benzoquinone and 0.37% of hydroquinone based on the weight of the liquid crystalline mixture.

When the composition was placed between a pair of electrodes at a distance of 25-microns from each other the thin film of the composition formed therebetween was transparent.

However, the liquid crystalline mixture consisting of the purified MBBA and cholesteryl nonanoate did not form a transparent thin film between a pair of transparent electrodes spaced 25 microns apart. In the present example, the same procedures and observations as Example 27 were repeated using the above liquid crystal composition. When a DC voltage of 30 volts was applied, the composition was whitened and exhibited dynamic scattering of light. In this change, the rise-time was less than 15 milliseconds. Even after the applied voltage was removed, the dynamic scattering of light was maintained for a long period of time, that is, the memory effect was shown. In the case where an AC voltage of 40 volts at a frequency of 50 Hertz was applied, the composition behaved in the same manner as those stated above.

What we claim is:

1. A liquid crystal composition capable of spontaneously forming therein a homogeneous alignment of liquid crystalline molecules, which comprises a liquid crystal material and an additive consisting of at least one five- or six-membered heterocyclic compound selected from the group consisting of isatin; 2,5-diketopiperazine; 1-phenyl-2,5-diketopiperazine; 1,4-diphenyl-2,5-diketopiperazine; 3-aminopyrazolone; 1-phenyl-3-aminopyrazolone; creatinine; α-amino -γ-butyrolactam; 5-amino-barbituric acid; 5-phenylbarbituric acid; 5-(σ-aminophenyl) barbituric acid; 4-phenylurazol; 4-(p-hydroxyphenyl) urazol; 4-(p-aminophenyl) urazol; 1-phenylurazole; 4-methylcarbostyril; carbostyril; 4-hydroxycarbostyril; hydantoin; hydantoin imide-(2); hydrouracil; 2,4-tetrahydroquinazoline-dion; 3-methylpyrazolone; 1,2,4-triazole-5-thiol; 1,2,4-triazole-3,5-dithiol; 1-(m-chlorophenyl) barbituric acid; isatoic acid anhydride; 2-hydroxypyridine; 3-amino-1,2,4-triazolo[1,2-d] barbituric acid; 8-hydroxyquinoline; tautomeric isomers of the above mentioned compounds, and mixtures of two or more of the above mentioned compounds.

2. A liquid crystal composition as claimed in claim 1, wherein said liquid crystal material contains at least one substance selected from the group consisting of nematic liquid crystal substances, smectic liquid crystal substances, cholesteric liquid crystal substances and mixtures of two or more of the above-mentioned substances.

3. A liquid crystal composition as claimed in claim 2, wherein said nematic liquid crystal substance is selected from the group consisting of p-alkoxybenzylidene-p'-n-alkylanilines in which the alkoxyl radical in the alkoxybenzylidene group has 1 to 4 carbon atoms and the n-alkyl group in the alkylaniline group has 1 – 12 carbon atoms: p-alkoxybenzylidene -p'-aminobenzonitriles in which the alkoxyl radical in the alkoxybenzylidene group has 1 to 8 carbon atoms: alkyl-p-azoxybenzoate wherein the alkyl radical has 1 to 4 carbon atoms, and; mixtures of two or more of the above compounds.

4. A liquid crystal composition as claimed in claim 3, wherein said p-alkoxybenzylidene-p'-n-alkylaniline is selected from the group consisting of p-methoxybenzylidene-p'-n-butylaniline, p-ethoxybenzylidene-p'-n-butylaniline, p-propoxybenzylidene-p'-n-octylaniline, p-methoxybenzylidene-p'-n-hexylaniline and p-methoxybenzylidene- p'-n-octylaniline.

5. A liquid crystal composition as claimed in claim 3, wherein said p-alkoxybenzylidene-p'-aminobenzonitrile is selected from the group consisting of p-butoxybenzylidene-p'-aminobenzonitrile, p-hexyloxybenzylidene-p'-aminobenzonitrile and p-octyloxybenzylidene-p'-aminobenzonitrile.

6. A liquid crystal composition as claimed in claim 3, wherein said alkyl-p-azoxybenzoate is ethyl-p-azoxybenzoate.

7. A liquid crystal composition as claimed in claim 2, wherein said cholesteric liquid crystal substance is selected from the group consisting of cholesteryl halides, cholesteryl esters of organic acids and mixtures of two or more thereof.

8. A liquid crystal composition as claimed in claim 7, wherein said cholesteryl halide is either cholesteryl chloride or cholesteryl bromide.

9. A liquid crystal composition as claimed in claim 7, wherein said cholesteryl ester is selected from the group consisting of cholesteryl nonanoate, cholesteryl benzoate and cholesteryl oleate.

10. A liquid crystal composition as claimed in claim 1, wherein said heterocyclic compound is present in an amount of 0.01 to 3.0% based on the weight of the liquid crystal material.

11. The liquid crystal composition as claimed in claim 1, which further contains a reversible or oxidation-reduction system in the form of a supplementary additive consisting of at least one substance selected from the class consisting of
   a. mixtures of at least one quinone compound and at least one quinone compound wherein oxo groups of the quinone compound are substituted by hydroxyl groups;
   b. organic cyclic compounds having at least one radical selected from the group consisting of hydroxyl and amino radicals and at least one radical selected from the group consisting of carbonyl and imino radicals, and;
   c. mixtures of at least one organic cyclic compound as defined in the above Item (b) and at least one compound selected from the group consisting of the quinone compounds and the substituted quinone compounds as defined in the above Item (a).

12. A liquid crystal composition as claimed in claim 11, wherein said supplementary additive is present in an amount of 0.01 to 3.0% based on the weight of said liquid crystalline substance.

13. A liquid crystal composition as claimed in claim 11, wherein said quinone compound is selected from the group consisting of benzoquinone, naphthoquinone, diphenoquinone, stilbenequinone, anthraquinone, phenanthrenequinone, benzoanthraquinone, benzophenanthrenequinone, functional derivatives of the above-mentioned compounds and mixtures of two or more of the above-mentioned compounds.

14. A liquid crystal composition as claimed in claim 11, wherein said substituted quinone compound is selected from the group consisting of hydroquinone, naphthohydroquinone, diphenohydroquinone, stilbenehydroquinone, hydroanthraquinone, hydrophenanthrenequinone, hydrobenzanthraquinone and hydrobenzphenanthrenequinone, functional derivatives of the above-mentioned compounds, and mixtures of two or more of the above-mentioned compounds.

15. A liquid crystal composition as claimed in claim 11, wherein said mixture of said quinone compound and said substituted quinone compound contains at least one complex of said quinone compound and said substituted quinone compound.

16. A liquid crystal composition as claimed in claim 15, wherein said complex is quinhydrone.

17. A liquid crystal composition as claimed in claim 11, wherein said organic cyclic compound is selected from the group consisting of hydroxycyclopentenones, hydroxycyclohexenones, hydroxybicycloheptanones, hydroxyindanones, hydroxynaphthoquinones, hydroxybenzophenones, hydroxydinaphthoquinones, hydroxydiphenoquinones, benzoin, hydroxyacetophenones, hydroxyanthrones, hydroxyanthraquinones, hydroxyphenanthrenequinones, hydroxyfluorenequinones, hydroxynaphthacenquinones, hydroxybenzanthrones, fuchsones, aminocyclohexeneimines, aminobicyclopheptanones, aminonaphthoquinones, naphthoquinoneimines, benzoquinoneimines, aminobenzoquinoneimines, aminonaphthoquinoneimines, aminobenzophenones, aminoanthrones, aminoanthraquinones, aminohydroxyanthraquinones, aminophenanthrenequinones, aminofluorenones, aminonaphthacenquinones, aminobenzanthrones, aminofuchsones, naphthapyridone, anthrapyridone, aminoanthrapyridones, aridone, phenazine, phenothiazine, phenooxazine and carbazole.

18. A liquid crystal composition as claimed in claim 17, wherein said hydroxyanthraquinone is either 1,5-dihydroxyanthraquinone — (9, 10) or 5, 8, 9, 10 -tetrahydroxyanthraquinone — (9, 10).

19. A liquid crystal composition as claimed in claim 17, wherein said aminoanthraquinone is 1,5-diaminoanthraquinone — (9, 10).

20. A liquid crystal composition as claimed in claim 17, wherein said aminohydroxyanthraquinone is 5,8-diamino-1,4-dihydroxyanthraquinone — (9, 10).

21. A liquid crystal composition as claimed in claim 17, wherein said aminofluorenone is 1-aminofluorenone.

22. A liquid crystal composition as claimed in claim 17, wherein said aminocyclohexeneimine is 3-amino-1,1-dimethylcyclohexene — (3) -one-imine-(5).

23. A liquid crystal composition as claimed in claim 17, wherein said aminoanthrapyridone is 6-aminoanthrapyridone.

24. A liquid crystal composition as claimed in claim 17, wherein said aminobenzoquinoneimine is 6-amino-2-methylbenzoquinone- (1) — imine — (4).

25. A liquid crystal composition as claimed in claim 17, wherein said aminonaphthoquinoneimine is 2.5-diaminonaphthoquinone — (1) — imine — (4).

26. A liquid crystal composition as claimed in claim 11, wherein said quinone compound and the substituted quinone compound in said mixture of the item (a) are present in a ratio by mole of 1 : 1 of the oxo groups in said quinone compound to the hydroxyl groups in said substituted quinone compound.

27. A liquid crystal composition as claimed in claim 11, wherein said organic cyclic compound and said quinone compound, said substituted quinone compound or a mixture thereof in said mixture of the item (c) are present in a ratio by mole of 9 : 1 to 1 : 9 of a sum of said radicals in said organic cyclic compound as specified in the item (b) to said oxo groups in said quinone compound, said hydroxyl groups in said substituted quinone compound or a sum thereof.

* * * * *